(12) United States Patent
Chun et al.

(10) Patent No.: US 8,031,292 B2
(45) Date of Patent: Oct. 4, 2011

(54) LIQUID CRYSTAL DISPLAY COMPRISING FIRST AND SECOND POINT LIGHT SOURCE ASSEMBLIES WHEREIN A FIRST SUPPORT SUBSTRATE IS LARGER THAN THE SECOND SUPPORT SUBSTRATE, AND A FIRST GROOVE OF A LOWER CONTAINER IS DEEPER THAN A SECOND GROOVE

(75) Inventors: Hyo-suck Chun, Suwon-si (KR);
Jin-woo Park, Cheonan-si (KR);
Kwang-hee Lee, Seoul (KR); Yong-seok Kwak, Seongnam-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 69 days.

(21) Appl. No.: 11/944,012

(22) Filed: Nov. 21, 2007

(65) Prior Publication Data
US 2008/0117361 A1    May 22, 2008

(30) Foreign Application Priority Data

Nov. 21, 2006  (KR) .................... 10-2006-0115165
Dec. 7, 2006   (KR) .................... 10-2006-0123917

(51) Int. Cl.
*F21V 7/04*    (2006.01)
*G02F 1/1335*  (2006.01)
*G02F 1/1333*  (2006.01)

(52) U.S. Cl. ............. 349/65; 349/58; 349/161; 362/613
(58) Field of Classification Search ................ 362/612, 362/613; 349/58, 65, 161
See application file for complete search history.

(56) References Cited

U.S. PATENT DOCUMENTS

| | | | | |
|---|---|---|---|---|
| 2001/0050847 A1* | 12/2001 | Suzuki et al. | ................. | 362/31 |
| 2002/0089840 A1* | 7/2002 | Kawakami et al. | ............. | 362/31 |
| 2003/0048628 A1* | 3/2003 | Lee et al. | ........................ | 362/27 |
| 2006/0114694 A1* | 6/2006 | Cho et al. | ..................... | 362/631 |
| 2007/0091639 A1* | 4/2007 | Yoo | .............................. | 362/612 |
| 2007/0153548 A1* | 7/2007 | Hamada et al. | ............... | 362/615 |
| 2008/0074580 A1* | 3/2008 | Chang | ........................... | 349/65 |

FOREIGN PATENT DOCUMENTS

| | | |
|---|---|---|
| JP | 2006-066725 | 3/2006 |
| KR | 20-1998-0030248 | 8/1998 |
| KR | 1020060030454 | 4/2006 |

* cited by examiner

*Primary Examiner* — Mark Robinson
*Assistant Examiner* — Dennis Y Kim
(74) *Attorney, Agent, or Firm* — F. Chau & Associates, LLC

(57) ABSTRACT

A liquid crystal display includes a light guide plate guiding incident light, a first point light source assembly including first point light source elements providing the light to the light guide plate and a first support substrate having the first point light source elements, the first point light source assembly being disposed at one side of the light guide plate, a second point light source assembly including second point light source elements providing the light to the light guide plate and a second support substrate having the second point light source elements, the second point light source assembly being disposed at the other side of the light guide plate, a liquid crystal panel assembly disposed on the light guide plate and displaying image information, and a lower container accommodating the light guide plate, first and second point light source assemblies, and liquid crystal panel assembly, wherein the first support substrate is larger in area than the second support substrate.

12 Claims, 13 Drawing Sheets

| BLU | LED | | |
| --- | --- | --- | --- |
| | LEFT | CENTER | RIGHT |
| THE RELATED ART | 44.4 | 47.4 | 42.2 |
| THE PRESENT INVENTION | 45.1 | 45.4 | 45.9 |

LIQUID CRYSTAL DISPLAY COMPRISING FIRST AND SECOND POINT LIGHT SOURCE ASSEMBLIES WHEREIN A FIRST SUPPORT SUBSTRATE IS LARGER THAN THE SECOND SUPPORT SUBSTRATE, AND A FIRST GROOVE OF A LOWER CONTAINER IS DEEPER THAN A SECOND GROOVE

CROSS REFERENCE TO RELATED APPLICATION

This application claims priority from Korean Patent Application Nos. 10-2006-0115165 and 10-2006-0123917 filed on Nov. 21, 2006 and Dec. 7, 2006, respectively, the disclosures of which are incorporated herein by reference in their entireties.

BACKGROUND OF THE INVENTION

1. Technical Field

The present disclosure relates to a display, and more particularly to a liquid crystal display including a point light source assembly.

2. Discussion of the Related Art

Liquid crystal displays are widely used flat panel displays. A liquid crystal display includes two substrates with electrodes and a liquid crystal layer interposed between the substrates. The liquid crystal display rearranges liquid crystal molecules in a liquid crystal layer by applying a voltage to electrodes to control the amount of light passing through the liquid crystal layer.

Because these liquid crystal molecules display images by changing light transmittance according to the direction and magnitude of an electromagnetic field, a liquid crystal display uses light for displaying images. Typical light sources used in liquid crystal displays are, for example, a light emitting diode (LED), a cold cathode fluorescent lamp (CCFL), and a flat fluorescent lamp (FFL).

LEDs have a characteristic of low power consumption and high luminance.

The emitting efficiency of the LEDs changes according to the change of a surrounding temperature. The change of emitting efficiency of the LEDs results in deterioration of display characteristics of liquid crystal displays. For example, the emitting efficiency of a red LED changes substantially according to changes in a surrounding temperature, and color spots appear due to decreased color uniformity for each region. The decrease in color uniformity occurs because the surrounding temperature is not uniform for each region of the liquid crystal display.

SUMMARY OF THE INVENTION

According to an exemplary embodiment of the present invention, a liquid crystal display includes a light guide plate guiding incident light, a first point light source assembly which includes first point light source elements providing the light to the light guide plate and a first support substrate having the first point light source elements and is disposed at a side of the light guide plate, a second point light source assembly which includes second point light source elements providing the light to the light guide plate and a second support substrate having the second point light source elements and is disposed at the other side of the light guide plate, a liquid crystal panel assembly disposed on the light guide plate and displaying image information, and a lower container accommodating the light guide plate, first and second point light source assemblies, and liquid crystal panel assembly. The first support substrate can be larger than the second support substrate in area.

According to an exemplary embodiment of the present invention, a liquid crystal display includes a light guide plate guiding incident light, a first point light source assembly which includes first point light source elements providing the light to the light guide plate and a first support substrate equipped with the first point light source elements and is disposed at a side of the light guide plate, a second point light source assembly which includes second point light source elements providing the light to the light guide plate and a second support substrate having the second point light source elements and is disposed at the other side of the light guide plate, a liquid crystal panel assembly disposed on the light guide plate and displaying image information, a lower container accommodating the light guide plate, first and second point light source assemblies, and liquid crystal panel assembly, and first and second heat conductive pads interposed between the lower container and the first and second point light source assemblies, respectively. The first heat conductive pad can be larger than the second heat conductive pad in area.

According to an exemplary embodiment of the invention, a liquid crystal display includes a light guide plate guiding incident light, a point light source assembly including point light source elements providing the light to the light guide plate and a support substrate having groups of point light source element comprising at least one of the point light source elements, a lower container accommodating the light guide plate and point light source assembly, and a heat conductive pad interposed between the point light source assembly and the lower container. The heat conductive pad can include unit regions having the groups of point light source elements, and the unit regions include a first unit region and a second unit region wherein the first unit region and the second unit region are different in size.

BRIEF DESCRIPTION OF THE DRAWINGS

Exemplary embodiments of the present invention can be understood in more detail from the following descriptions taken in conjunction with the accompanying drawings in which.

DESCRIPTION OF EXEMPLARY EMBODIMENTS

The invention is described more fully hereinafter with reference to the accompanying drawings, in which exemplary embodiments of the invention are shown. The invention may, however, be embodied in many different forms and should not be construed as limited to the exemplary embodiments set forth herein.

A liquid crystal display according to an exemplary embodiment of the invention is described with reference to FIGS. 1 to 4.

Figure 1:
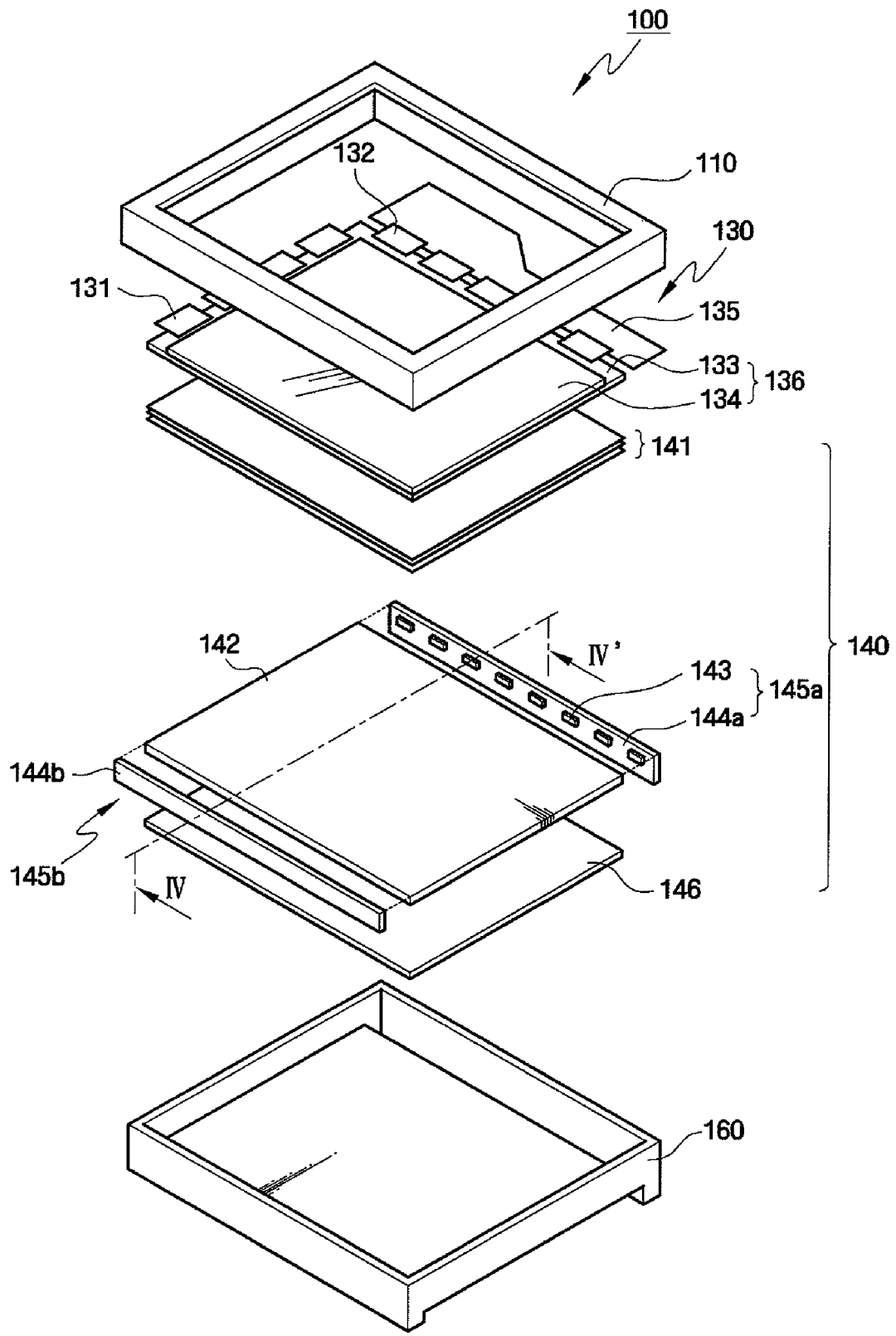
FIG. 1 is an exploded perspective view of a liquid crystal display according to an exemplary embodiment of the present invention.

FIG. 1 is an exploded perspective view of a liquid crystal display according to an exemplary embodiment of the present invention.

Referring to FIG. 1, a liquid crystal display 100 according to an exemplary embodiment of the present invention includes a liquid crystal panel assembly 130, a backlight unit 140, an upper container 110, and a lower container 160.

The liquid crystal panel assembly 130 includes a liquid crystal panel 136 including a lower display substrate 133, an upper display substrate 134 and a liquid crystal layer (not shown) inserted between the display substrates, a gate chip film package 131, a data chip film package 132, and a printed circuit board 135.

The liquid crystal panel 136 includes the lower display substrate 133 that includes gate lines (not shown), data lines (not shown), a thin film transistor array, pixel electrodes and the upper display substrate 134 that includes color filters, a black matrix, and a common electrode and faces the lower display substrate 133. The color filters and common electrode may be formed on the lower display substrate 133. The liquid crystal panel 136 displays image information.

The gate chip film package 131 is connected to each gate line (not shown) formed on the lower display substrate 133 and provides each gate line with gate driving signals. The data chip film package 132 is connected to each data line (not shown) formed on the lower display substrate 133 and provides each data line with data driving signals. The gate chip film package 131 and data chip film package 132 include a Tape Automated Bonding (TAB) tape with a semiconductor chip bonded with a wiring pattern formed on a base film by Tape Automated Bonding (TAB). For example, for the gate and data chip film packages 131, 132, a tape carrier package (TCP) or a chip on film (COF) can be used according to an exemplary embodiment of the present invention.

The printed circuit board 135 is mounted with a variety of driving elements that process gate driving signals inputted into the gate chip film package 131 and data driving signals inputted into the data chip film package 132. The printed circuit board 135 is connected with the liquid crystal panel 136 and provides image information to the liquid crystal panel 136.

The backlight unit 140 includes optical sheets 141, a light guide plate 142, first and second point light source assemblies 145a, 145b, and a reflecting sheet 146.

The light guide plate 142 guides light supplied from the first and second point light source assemblies 145a, 145b to the liquid crystal panel 136. The light guide plate 142 comprises a plate of a transparent material. For example, an acrylic resin, such as PolyMethyl MethAcrylate (PMMA), or polycarbonate can be used as the light guide plate 142. When incident light through a side of the light guide plate 142 reaches the upper or lower surface of the light guide plate 142 over the critical angle of the light guide plate 142, the incident light is reflected from the surface of the light guide plate 142 and transmitted throughout the inside of the light guide plate 142 without leakage.

A diffusion pattern (not shown) is formed on at least one of the upper and lower surfaces of the light guide plate 142 to guide the light inside the light guide plate 142 to travel to the liquid crystal panel 136 disposed on the light guide plate 142. In an exemplary embodiment, a diffusion pattern may be formed on the lower surface of the light guide plate 142. That is, the light inside the light guide plate 142 is reflected from the diffusion pattern and travels outside through the upper surface of the light guide plate 142. The diffusion pattern formed on a surface of the light guide plate 142 may change in size and density according to the distance from the first and second point light source assemblies 145a, 145b to maintain the light traveling outside through the entire surface of the light guide plate 142 uniform in luminance. For example, the larger the distance from the first and second point light source assemblies 145a, 145b, the larger the density or size of the diffusion pattern, so that the light traveling outside through the entire surface can be uniform.

The diffusion pattern may be formed by, for example, a silk screen printing of ink. A diffusion pattern that has substantially the same operational effect may be formed by forming fine grooves or protrusions on the light guide plate 142.

The first and second point light source assemblies 145a, 145b are disposed at both sides of the light guide plate 142. In an exemplary embodiment, the light guide plate 142 can be formed, for example, in a flat plate shape with a substantially uniform thickness to uniformly transmit light throughout the display.

The first point light source assembly 145a supplies light to the liquid crystal panel 136 that is a passive light emitting component. The first point light source assembly 145a includes a plurality of point light source elements 143 and a first support substrate 144a having the point light source elements 143 disposed thereon. The second point light source assembly 145b supplies light to the liquid crystal panel 136. The second point light source assembly 145b includes a plurality of point light source elements (not shown) and a second support substrate 144b having the point light source elements. The first point light source assembly 145a is disposed on a first inside of the lower container 160 that is close to the data chip film package 132. The second point light source assembly 145b is disposed on a second inside facing the first inside of the lower container 160.

The point light source elements 143 are formed on sides of the first and second support substrates 144a, 144b at regular intervals by contact terminals. The first and second support substrates 144a, 144b may be formed into a long rectangular plate. For example, the first and second support substrates 144a, 144b may be formed of a printed circuit board (PCB) or a flexible printed circuit board (FPC).

Each of the point light source elements 143 includes a light emitting element that emits light, for example, directly. For example, the point light source element 143 may be an LED, an incandescent lamp, and a white halogen lamp. Each of the point light source element 143 includes a frame (not shown) and red, green, and blue light emitting chips disposed inside the frame. White light is produced by mixing red, green, and blue light emitted from each light emitting chip.

Figure 2:
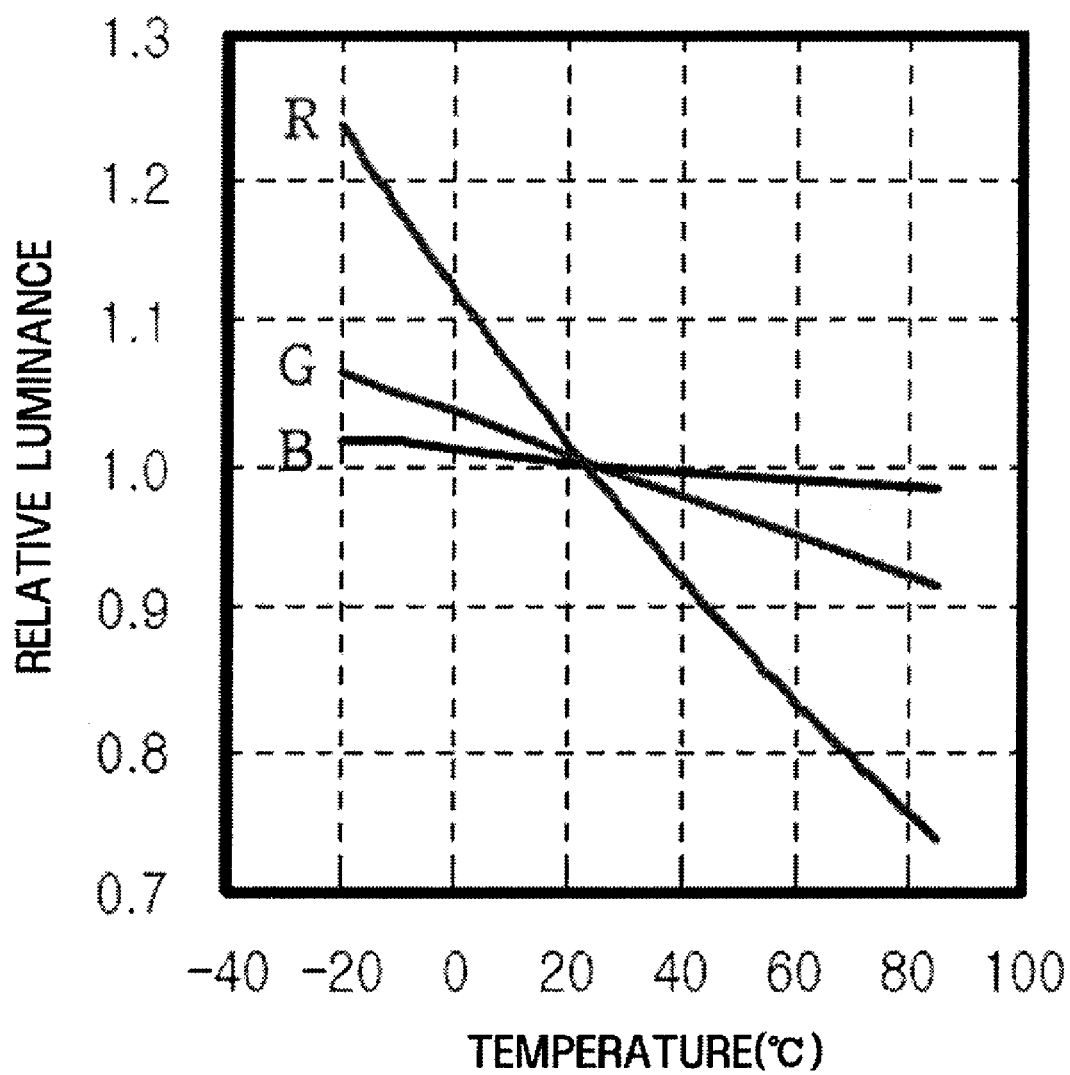
FIG. 2 is a graph showing a luminance of an emitting chip in relation to a surrounding temperature.

FIG. 2 is a graph that shows a luminance of light emitting chips in relation to a surrounding temperature. The relative luminance is based on the luminance of light radiated from the light emitting chips at a temperature of about 25° C.

As shown in FIG. 2, relative luminance of a red light emitting chip R rapidly changes with respect to temperature as compared with a green light emitting chip G and blue light emitting chip B. The point light source element 143 comprises the red, green, and blue light emitting chips R, G, B. When temperatures are different at each region where the point light source elements 143 are disposed, color scheme of red, green, and blue light radiated from each point light source element 143 varies, which reduces color uniformity.

Referring to FIG. 1, the reflecting sheet 146 is disposed under the light guide plate 142 and reflects light that travels down out of the light guide plate 142 upwardly. The reflecting sheet 146 reduces loss of light entering the liquid crystal panel 136 and improves color uniformity of light passing through the exit surface of the light guide plate 142 by reflecting light, which is not reflected by the diffusion pattern on a side of the light guide plate 142, to the exit surface of the light guide plate 142.

For example, the reflecting sheet 146 may comprise polyethylene terephthalate (PET) and a side of the reflecting sheet 146 may be coated with a diffusion layer that contains, for example, titanium dioxide. As titanium dioxide is dried and fixed, light can be more uniformly diffused by a white surface of frost formed by the titanium dioxide and predetermined reflective effect is achieved.

The optical sheets 141, disposed on the upper surface of the light guide plate 142, diffuse and concentrate light transmitted from the light guide plate 142. The optical sheets 141 include, for example, a diffusion sheet, a prism sheet, and a protection sheet. Disposed between the light guide plate 142 and the prism sheet, the diffusion sheet prevents a partial concentration of light by distributing light from the light guide plate 142. The prism sheet has an upper surface with a predetermined array of triangular prisms and may comprise, for example, two sheets. The prism arrays that cross with each other at a predetermined angle concentrate light diffused from the diffusion sheet perpendicularly to the liquid crystal panel 136. Accordingly, most light passing through the prism sheet perpendicularly travels and luminance is uniformly distributed on the protection sheet. The protection sheet, formed on the prism sheet, protects the surface of the prism sheet, and diffuses light to uniformly distribute the light. Configuration of the optical sheets 141 is not limited to the above and may be variously modified.

The liquid crystal panel 136 is formed on the protection sheet and placed inside the lower container 160 together with the backlight unit 140. The lower container 160 has sides formed along the edge of the bottom (see 164 in FIG. 3). The lower container 160 accommodates the backlight unit 140 and the liquid crystal panel assembly 130 inside the sides. The lower container 160 prevents the backlight unit 140 with a plurality of sheets from being bent. The printed circuit board 135 of the liquid crystal panel assembly 130 is bent and placed onto the outside of a side of the lower container 160, e.g., a rear side of the lower container 160. The lower container 160 may have a variety of shapes, depending on, for example, the ways of disposing the backlight unit 140 or the liquid crystal panel assembly 130 into the lower container 160.

The upper container 110 is combined with the lower container 160. The upper container 110 covers the upper surface of the liquid crystal panel assembly 130 placed in the lower container 160. A window is formed on the upper surface of the upper container 110 to expose the liquid crystal panel assembly 130 to the outside.

The upper container 110 may be combined with the lower container 160 by, for example, hooks (not shown). In an exemplary embodiment, the hooks are formed on the outsides of the sides of the lower container 160 and corresponding hook-inserting holes (not shown) are formed in the sides of the upper container 110. Accordingly, when the upper container 110 and the lower container 160 are combined by moving the upper container 110 down over the lower container 160, the hooks of the lower container 160 are inserted into the hook-inserting holes of the upper container 110 and the upper container 110 is fastened with the lower container 160. The upper container 110 and lower container 160 may be combined in a variety of ways.

Figure 3:
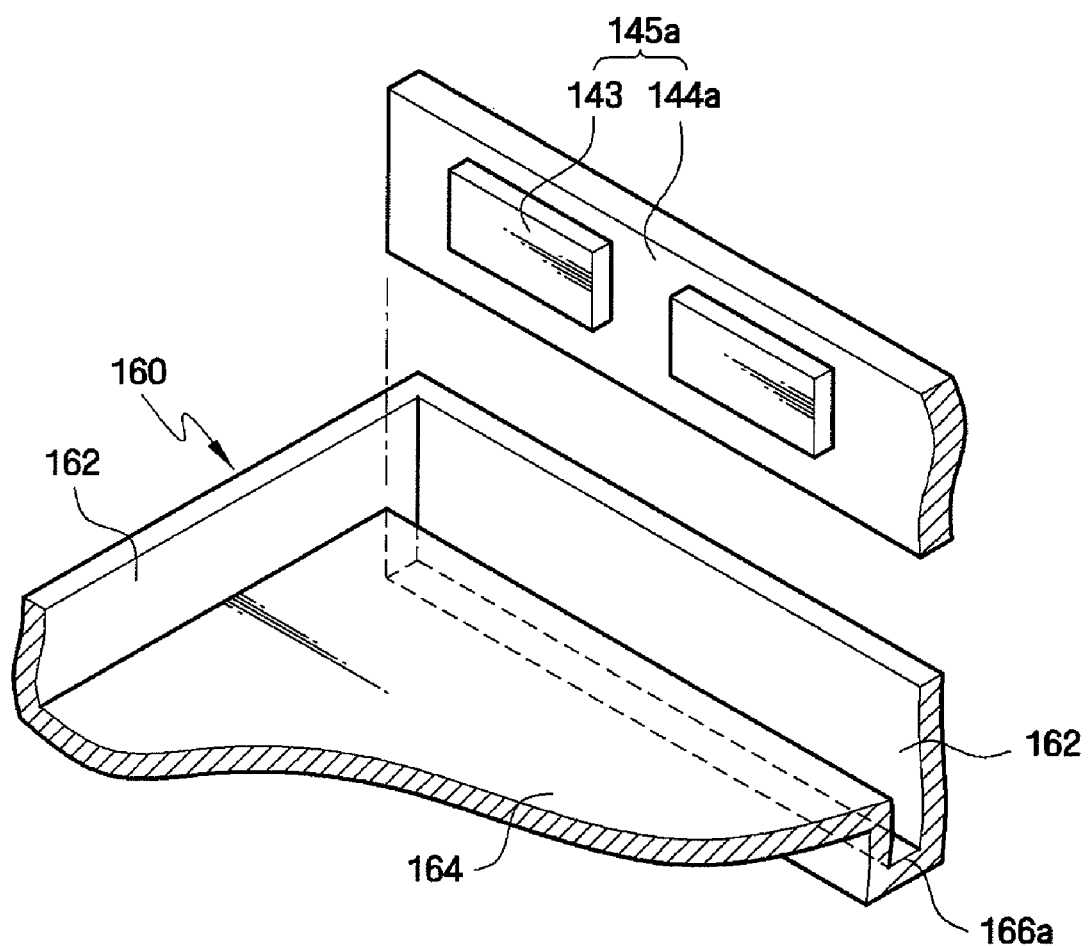
FIG. 3 is a partial perspective cut-away view illustrating a first point light source assembly and a lower container according to an exemplary embodiment of the present invention.
Figure 4:
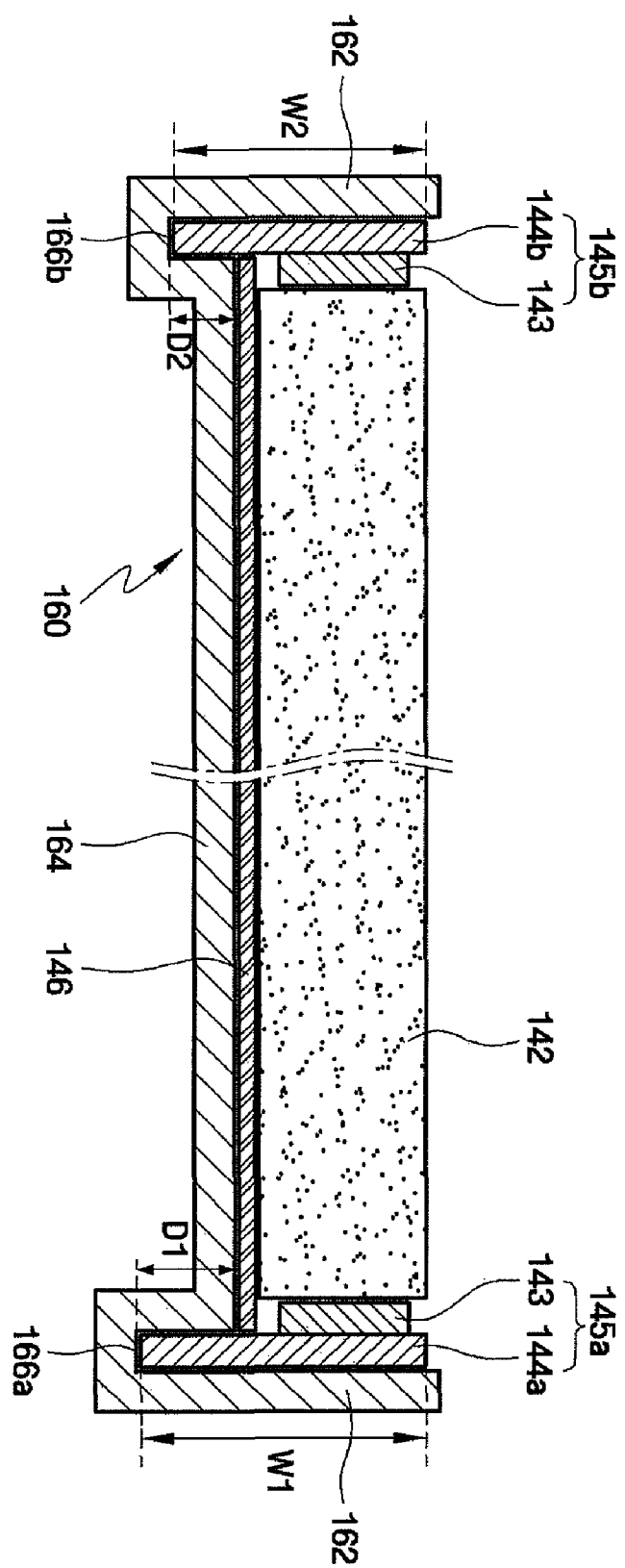
FIG. 4 is a cross-sectional view of a liquid crystal display taken along the line IV-IV' of FIG. 1.

FIG. 3 is a partial perspective cut-away view illustrating the first point light source assembly 145a and the lower container 160 according to an exemplary embodiment of the present invention. FIG. 4 is a cross-sectional view of a liquid crystal display taken along the line IV-IV' in FIG. 1.

Referring to FIGS. 3 and 4, as described above, the lower container 160 has sides 162 formed along the edge of the bottom 164. A first groove 166a and a second groove 166b are formed on the bottom 164 along two sides 162. The first and second point light source assemblies 145a, 145b are inserted in the first groove 166a and second groove 166b, respectively. The first and second support substrates 144a, 144b are inserted into the first and second grooves 166a, 166b, respectively, close to the sides 162 of the lower container 160.

The first point light source assembly 145a is disposed adjacent to the side 162 of the lower container 160, close to the data chip film package 132, and the second point light source assembly 145b is disposed adjacent to the opposite side to the first point light source assembly 145a. The region around the first point light source assembly 145a is higher in temperature than the region adjacent to the second point light source assembly 145b due to the heat generated by a driving IC (integrated circuit) (IC) mounted in the data chip film package 132. Non-uniformity of temperature in the regions reduces color uniformity.

Heat generated from the point light elements 143 of the first and second point light source assemblies 145a, 145b is conducted to the sides 162 of the lower container 160 through the first and second support substrates 144a, 144b and transmitted outside. To decrease the temperature around the first point light source assembly 145a, more heat out of the first point light source assembly 145a can be dissipated to the outside as compared with the second point light source assembly 145b. In an exemplary embodiment, the area of the first support substrate 144a is larger than the second support substrate 144b. For example, the first and second support substrates 144a, 144b are formed into a long rectangular plate. In an exemplary embodiment, the sides of the first and second support substrates 144a, 144b can face the sides 162 of the lower container 160, and the width W1 of the first support substrate 144a can be larger than the width W2 of the second support substrate 144b. For example, when the width W1 of the first support substrate 144a is 1.2 times larger than the width W2 of the second support substrate 144b, the region around the first point light source assembly 145a can decrease the temperature by about 2° C. to about 5° C.

For the first point light source assembly 145a disposed at the relatively high-temperature region, color uniformity can be improved by increasing the area of the first support substrate 144a facing the side 162 of the lower container 160 while decreasing the surrounding temperature.

Since the first support substrate 144a is larger than the second support substrate 144b in area, the first groove 166a may be formed with a depth D1 which is larger than the second groove 166b with a depth D2. Therefore, the point light elements 143 of the first and second point light source assemblies 145a, 145b are regularly located at predetermined positions, facing the light guide plate 142.

Figure 5A:
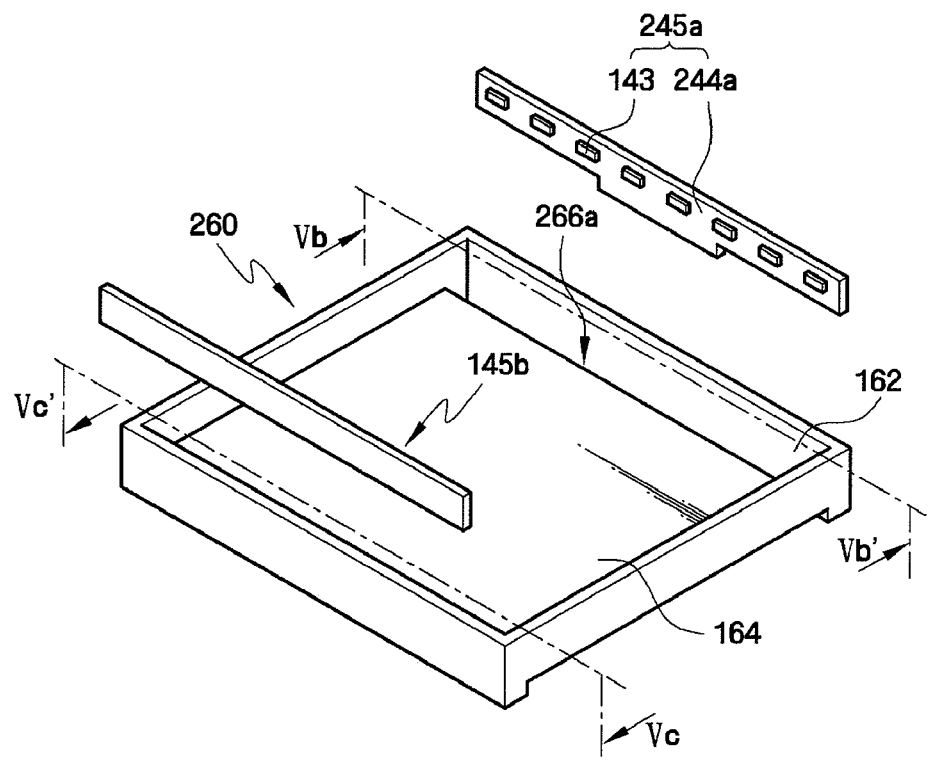
FIG. 5A is an exploded perspective view showing a point light source assembly and a lower container accommodating the point light source assembly included in a liquid crystal display according to an exemplary embodiment of the present invention.
Figure 5B:
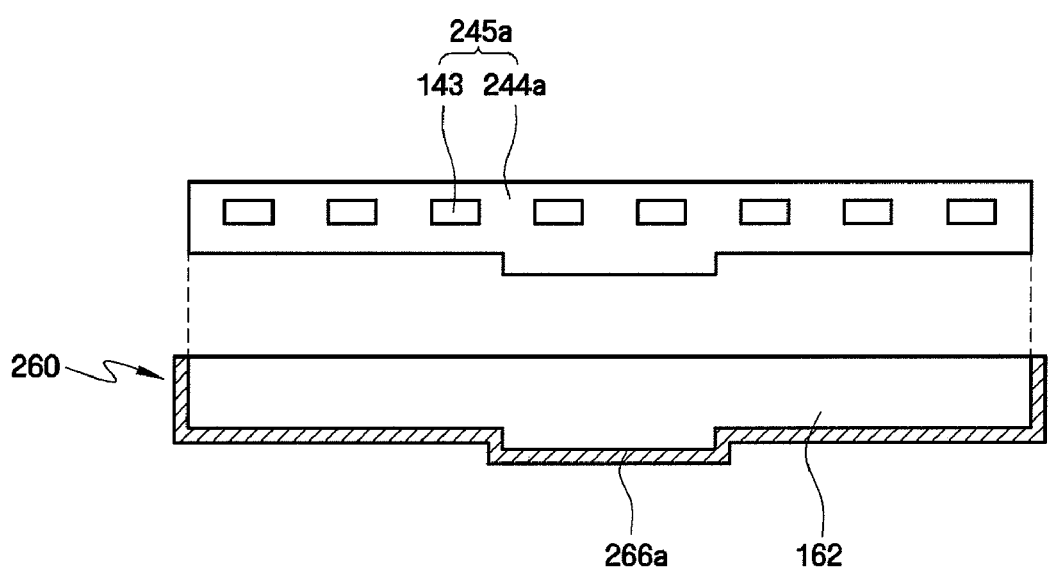
FIG. 5B is a cross-sectional view of a point light source assembly and a lower container taken along the line Vb-Vb' of FIG. 5A.
Figure 5C:
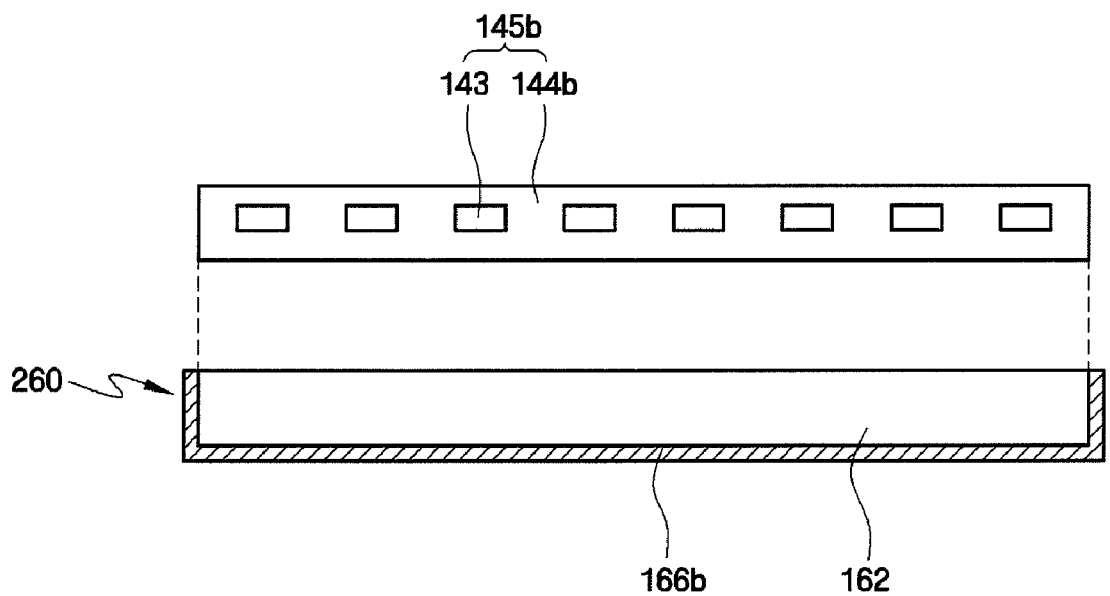
FIG. 5C is a cross-sectional view of a point light source assembly and a lower container taken along the line Vc-Vc' of FIG. 5A.

FIG. 5A is an exploded perspective view showing a point light source assembly and a lower container accommodating the point light source assembly included in a liquid crystal display according to an exemplary embodiment of the present invention. FIG. 5B is a cross-sectional view of a point light source assembly and a lower container taken along the line Vb-Vb' in FIG. 5A. FIG. 5C is a cross-sectional view of a point light source assembly and a lower container taken along the line Vc-Vc' in FIG. 5A.

Referring to FIGS. 5A to 5C, a first point light source assembly 245a includes a plurality of point light elements 143 and a first support substrate 244a having the point light elements 143. A first groove 266a to receive the first point light source assembly 245a and a second groove 166b to receive the second point light source assembly 145b are formed on the bottom of a lower container 260 along two sides 162.

Because the first point light source assembly 245a is disposed close to the data chip film package 132, the region around the first point light source assembly 245a is higher in temperature than the region around the second point light source assembly 145b due to heat generated by a driving IC mounted in the data chip film package 132. The central portion is higher in temperature than both sides in the first point light source assembly 245a.

To decrease the temperature of the first point light source assembly 245a at a level approximate to the second point light source assembly 145b, the area of the first support substrate 244a can be larger than the second support substrate 144b. To decrease the temperature of the central portion at a level approximate to both side portions of the first point light source assembly 245a, the central area can be formed larger than the side portions of the first support substrate 244a. In an exemplary embodiment, the central width is larger than the side width of the first support substrate 244a. For example, the first support substrate 244a may be formed into a T-shape. When the central width is about 1.1 to about 1.2 times larger than the side width of the first support substrate 244a, the central portion can decrease the temperature by about 2° to about 5° C.

The side width of the first support substrate 244a may be set substantially the same as or larger than the width of the second support substrate 144b.

Color uniformity of the LCD 100 can be improved by forming the central width larger than the side width of the first support substrate 244a because the temperature of the central portion can be reduced.

Since the central width of the first support substrate is larger than the side width of the first support substrate 244a, the corresponding central portion of the first groove 266a can be formed deeper than the corresponding side portions of the first groove 266a.

Figure 6A:
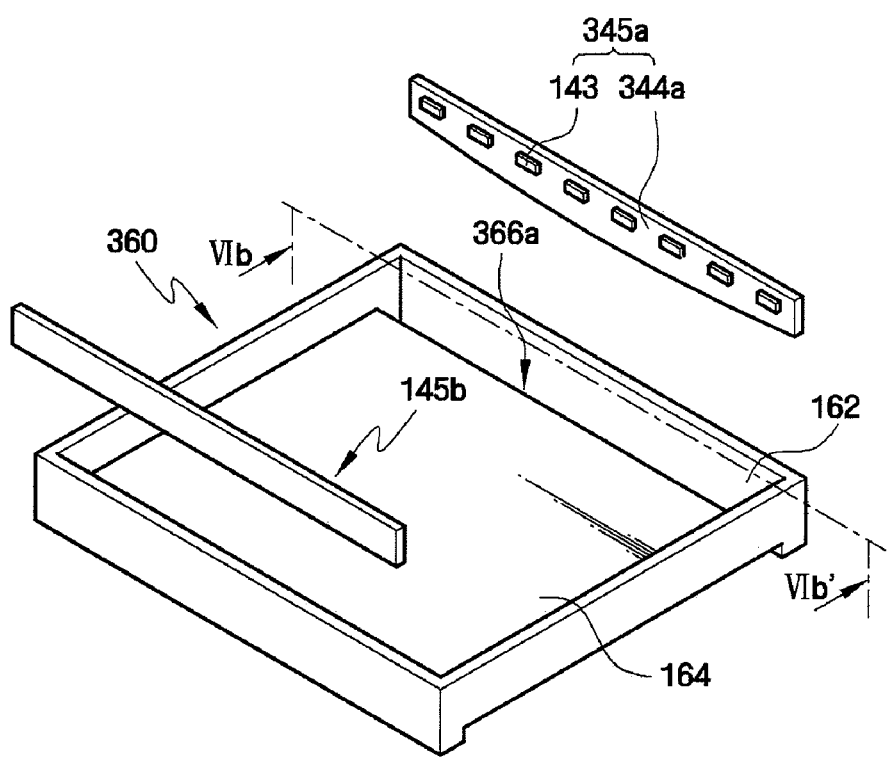
FIG. 6A is an exploded perspective view showing a point light source assembly and a lower container accommodating the point light source assembly included in a liquid crystal display according to an exemplary embodiment of the present invention.
Figure 6B:
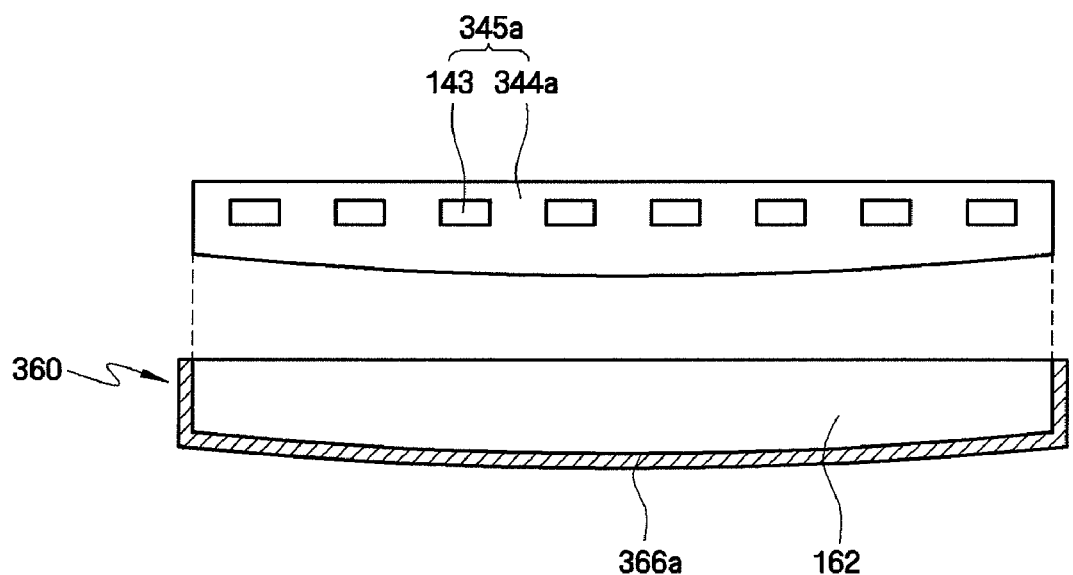
FIG. 6B is a cross-sectional view of a point light source assembly and a lower container taken along the line VIb-VIb' of FIG. 6A.

FIG. 6A is an exploded perspective view showing a point light source assembly and a lower container accommodating the assembly included in a liquid crystal display according to an exemplary embodiment of the present invention. FIG. 6B is a cross-sectional view of a point light source assembly and lower container taken along the line VIb-VIb' of FIG. 6A.

Referring to FIGS. 6A and 6B, a first point light source assembly 345a includes a plurality of point light source elements 143 and a first support substrate 344a having the point light source elements 143. A first groove 366a to receive the first point light source assembly 345a and a second groove (not shown) to receive the second point light source assembly 145b are formed on the bottom of a lower container 360 along two sides 162.

Because the first point light source assembly 345a is disposed close to the data chip film package 132, the region around the first point light source assembly 345a is higher in temperature than the region around the second point light source assembly 145b due to heat generated by a driving IC mounted in the data chip film package 132. The central portion of the first point light source assembly 345a is higher in temperature than short-side portions of the first point light source assembly 345a.

To decrease the temperature of the first point light source assembly 345a at a level approximate to the second point light source assembly 145b, the area of the first support substrate 344a can be larger than the second support substrate 144b. To decrease the temperature of the central portion of the first light source assembly 345a to a level approximate to both side portions of the first point light source assembly 345a, the central portion can be formed larger than the side portions of the first support substrate 344a. The central width of the first support substrate 344a can be larger than the side width of the first support substrate 344a. For example, the first support substrate 344a may be formed into an arch with a wide central portion.

Color uniformity of the LCD 100 can be improved by increasing the central width of the first support substrate 344a than the side width of the first support substrate 344a.

Since the central width of the first support substrate 344a is larger than the side width of the first support substrate 344a, the first groove 366a can be formed in an arch with the central portion deeper than the side portions to correspond to the shape of the first support substrate 344a.

Figure 7A:
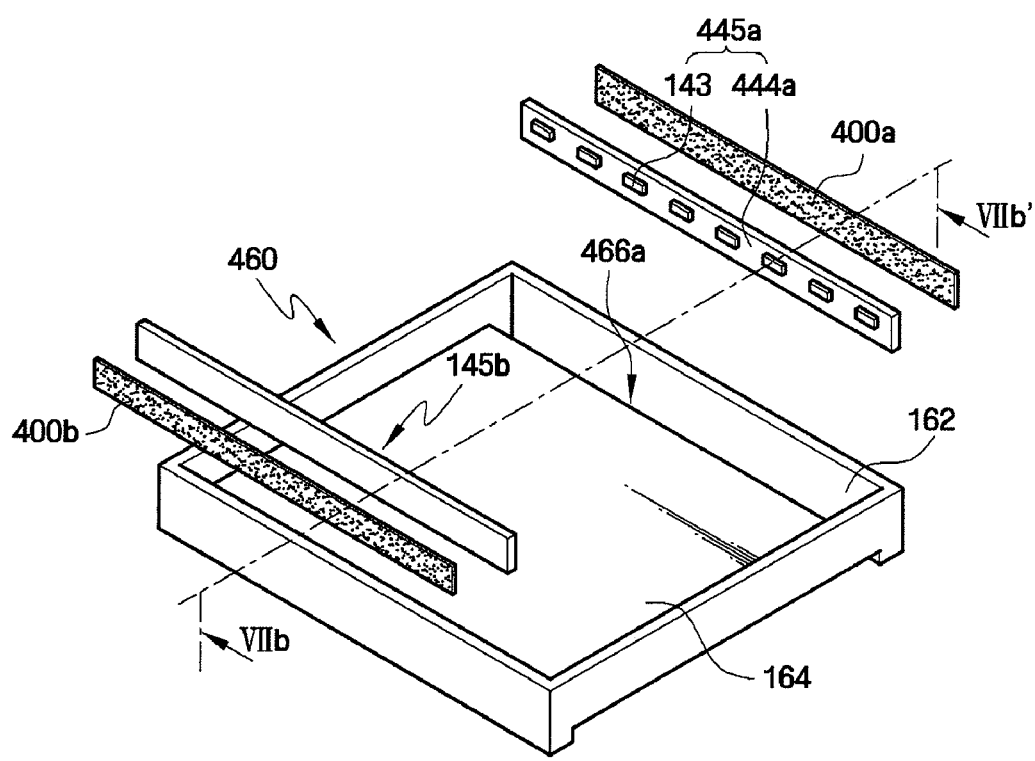
FIG. 7A is an exploded perspective view of a point light source assembly and a lower container accommodating the point light source assembly included in a liquid crystal display according to an exemplary embodiment of the present invention.
Figure 7B:
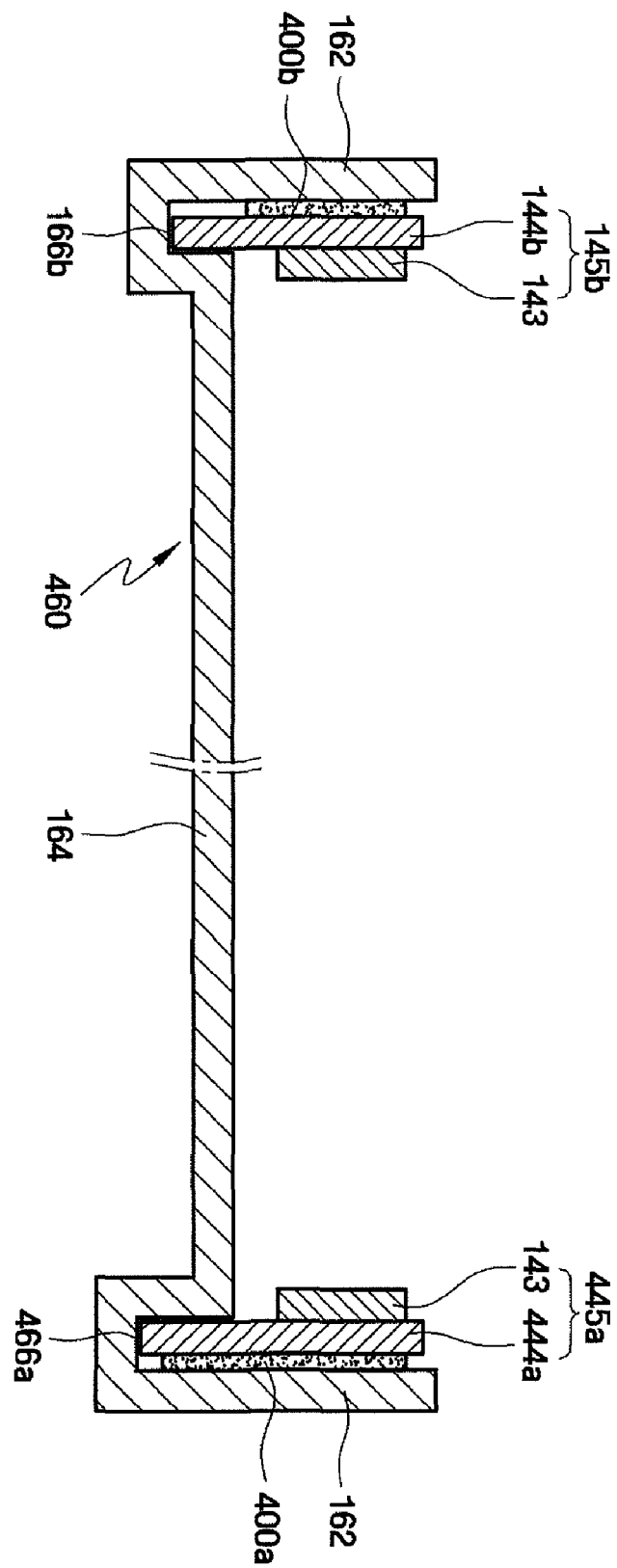
FIG. 7B is a cross-sectional view of a point light source assembly and a lower container taken along the line VIIb-VIIb' of FIG. 7A.

FIG. 7A is an exploded perspective view of a point light source assembly and a lower container accommodating the assembly included in a liquid crystal display according to an exemplary embodiment of the present invention. FIG. 7B is a cross-sectional view of a point light source assembly and a lower container taken along the line VIIb-VIIb' in FIG. 7A.

Referring to FIGS. 7A and 7B, a first point light source assembly 445a includes a plurality of point light source elements 143 and a first support substrate 444a having the point light source elements 143 thereon. A first groove 466a to receive the first point light source assembly 445a and a second groove 166b to receive the second point light source assembly 145b are formed on the bottom of a lower container 460 along two sides 162.

Because the first point light source assembly 445a is disposed close to the data chip film package 132, the region around the first point light source assembly 445a is higher in temperature than the region around the second point light source assembly 145b due to heat generated by a driving IC mounted in the data chip film package 132.

Heat generated from the point light source elements 143 in the first point light source assembly 445a is transmitted to the side 162 of the lower container 460 through the first support substrate 444a and a first heat conductive pad 400a interposed between the first support substrate 444a and the side 162 of the lower container 460. Heat generated from the point light source elements 143 in the second point light source assembly 145b is transmitted to the side 162 of the lower container 460 through the second support substrate 144b and a second heat conductive pad 400b interposed between the second support substrate 144b and side 162 of the lower container 460. Respectively interposed between the first and second point light source assemblies 445a and 145b and the side 162 of the lower container 460, the first and second heat conductive pads 400a, 400b dissipate heat generated from the first and second point light source assemblies 445a and 145b to the outside. The first and second heat conductive pads 400a, 400b may be used to attach the first and second point light source assemblies 445a and 145b to the sides of the lower container 460.

To decrease the temperature of the first point light source assembly 445a at a level approximate to the second point light source assembly 145b, the area of the first heat conductive pad 400a can be larger than the second heat conductive pad 440b. For example, when the first and second heat conductive pads 400a, 400b are formed into a long rectangular plate, the width of the first heat conductive pad 400a can be larger than the width of the second heat conductive pad 400b. For example, when the width of the first heat conductive pad 400a is 1.2 times larger than the second heat conductive pad 400b the first point light source assembly 445a can decrease the temperature by about 2° C. to about 5° C.

Color uniformity of the LCD 100 can be improved by forming the width of the first heat conductive pad 400 larger than the second heat conductive pad 440b.

In an exemplary embodiment, the first support substrate 444a may have a larger area than the second support substrate 144b to further decrease the temperature around the first point light source assembly 445a.

In an exemplary embodiment of the present invention, uniformity in temperature is achieved throughout the liquid crystal display 100 by forming the area of the first heat conductive pad 400a larger than the second heat conductive pad 400b. In an exemplary embodiment of the present invention, uniformity of temperature is achieved by using a material having a higher heat conductivity for the first heat conductive pad 400a as compared with the second heat conductive pad 400b.

Figure 8:
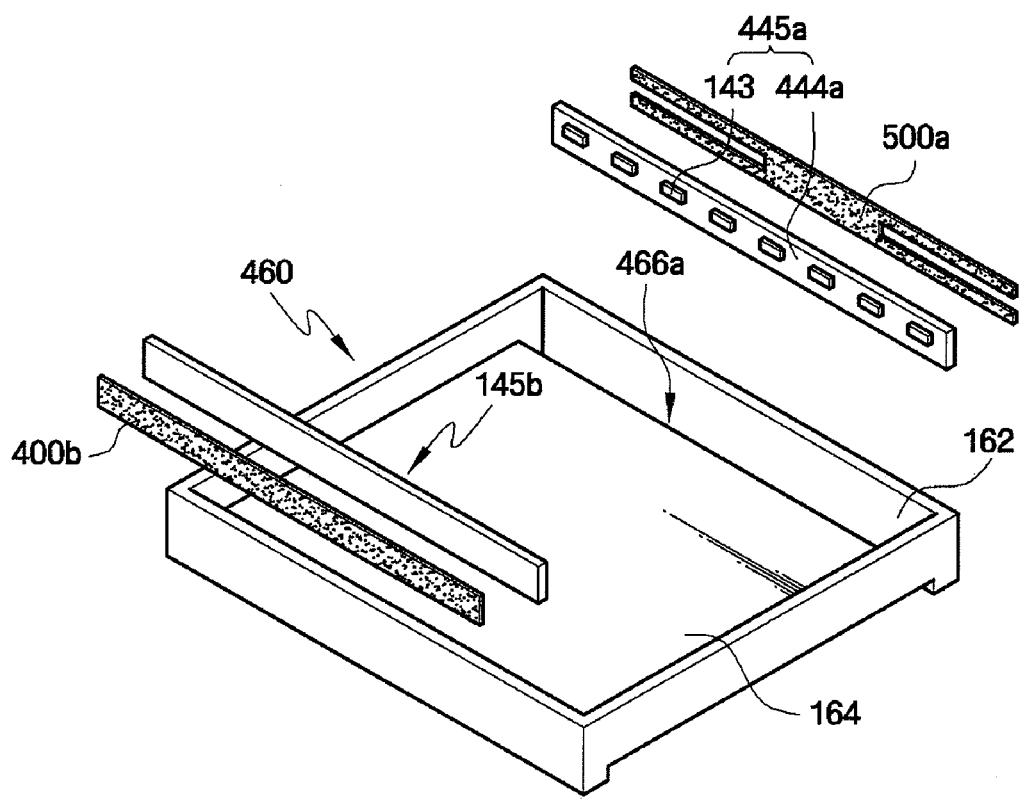
FIG. 8 is an exploded perspective view of a point light source assembly and a lower container accommodating the point light source assembly according to an exemplary embodiment of the present invention.

FIG. 8 is an exploded perspective view of the point light source assembly and a lower container accommodating the assembly according to an exemplary embodiment of the present invention.

Because the first point light source assembly 445a is disposed close to the data chip film package 132, the region around the first point light source assembly 445a is higher in temperature than the region around the second point light source assembly 145b due to heat generated by a driving IC mounted in the data chip film package 132. The central portion is higher in temperature than short-side portions in the first point light source assembly 445a.

Heat generated from the point light source elements 143 in the first point light source assembly 445a is transmitted to the side 162 of the lower container 460 through the first support substrate 444a and a first heat conductive pad 500a interposed between the first support substrate 444a and the side 162 of the lower container 460. Interposed between the first point light source assembly 445a and the side 162 of the lower container 460, the first heat conductive pads 500a dissipates heat generated from the first point light source assembly 445a to the outside. The first heat conductive pad 500a may be used to attach the first point light source assembly 445a to the side of the lower container 460.

Figure 9:
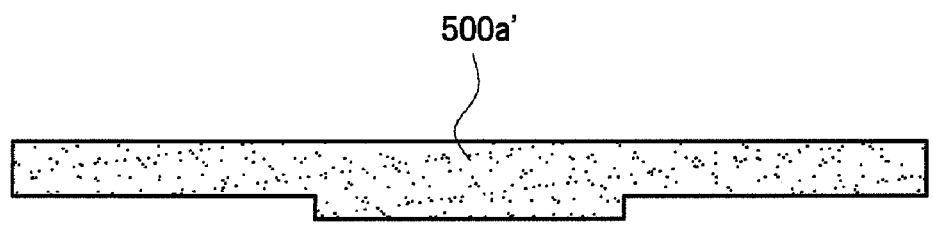
FIG. 9 is a first heat conductive pad according to an exemplary embodiment of the present invention.

To decrease the central temperature at a level approximate to the side portions in the first point light source assembly 445a, the central area is formed larger than the side areas in the first heat conductive pad 500a. In an exemplary embodiment, the first heat conductive pad 500a has larger width at the central portion than the side portions. For example, the first heat conductive pad 500a may have an H-shape. For example, as shown in FIG. 9, a first heat conductive pad 500a' may have a T-shape.

For the central portion of the first point light source assembly 445a disposed at a relatively high-temperature region, color uniformity can be improved by increasing the central width than the sides in the first heat conductive pad 500a with decrease in temperature.

In an exemplary embodiment, the color uniformity using the first heat conductive pad 500a can be achieved by making the central portion corresponding to the central portion of the first support substrate 444a of a material having a higher heat conductivity as compared with the side portions corresponding to the side portions of the first support substrate 444a.

Figure 10A:
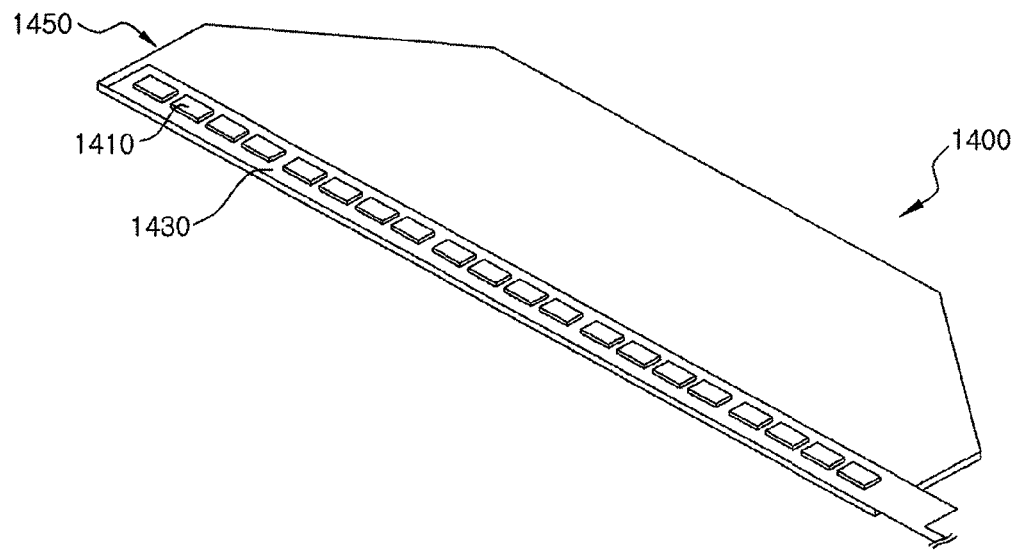
FIG. 10A is a perspective view of a point light source assembly included in a liquid crystal display according to an exemplary embodiment of the present invention.
Figure 10B:
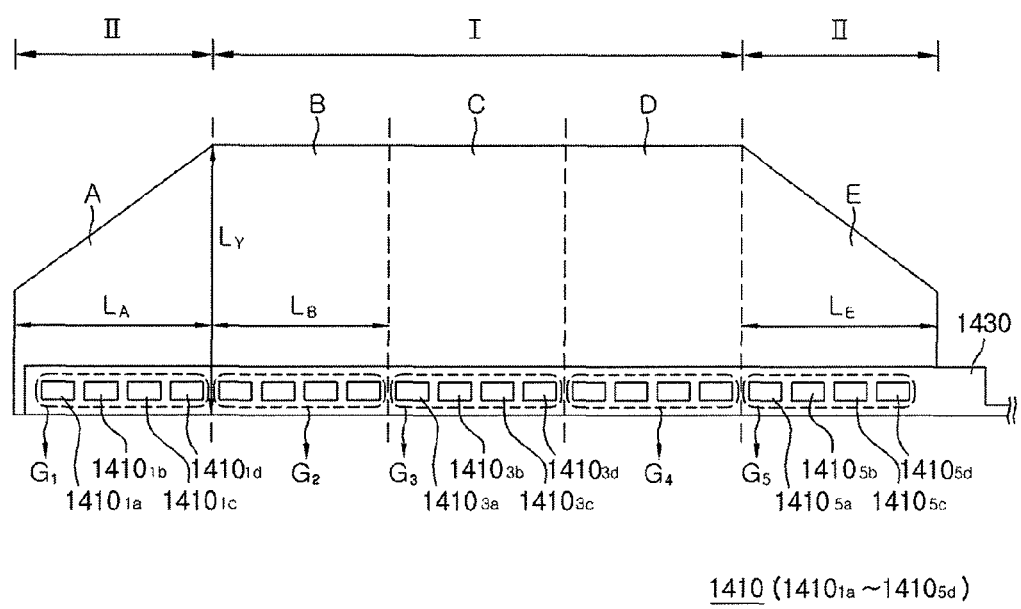
FIG. 10B is a plan view of a point light source assembly according to an exemplary embodiment of the present invention.
Figure 11:
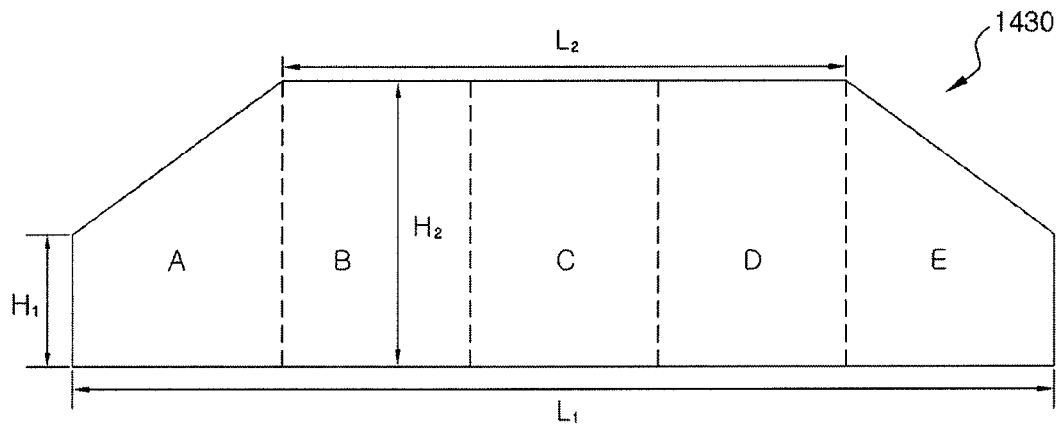
FIG. 11 is a diagram of a heat conductive pad of a point light source assembly according to an exemplary embodiment of the present invention.

FIG. 10A is a perspective view of a point light source assembly included in a liquid crystal display according to an exemplary embodiment of the invention. FIG. 10B is a plan view of the point light source assembly according to an exemplary embodiment of the present invention. FIG. 11 is a diagram of a heat conductive pad in a point light source assembly according to an exemplary embodiment of the present invention.

Referring to FIGS. 10A and 10B, a point light source assembly 1400 includes point light source components 1410, a support substrate 1430, and a heat conductive pad 1450. Each point light source element 1410 includes a light emitting chip (not shown). The light emitting chip is a PN junction diode, in which when P- and N-type diodes are bonded and a voltage is applied to the diodes, and holes of the P-type semiconductor are concentrated on the intermediate layer of the N-type semiconductor. The electrons of the N-type semiconductor that are concentrated on the intermediate layer that is the lowest part of a conduction band of the P-type semiconductor. The electrons drop on the holes of a valence band. When the electrons drop, energy corresponding to the difference in potential levels of the conduction band and valence band, i.e. an energy gap, is released into light. Alternatively, light emitting chip that emits light in a variety of ways may be used. The light emitting chip can emit light with a variety of wavelengths. To emit light with a variety of wavelengths, for example, it is possible to adjust content of indium that is used as an active layer in nitride-based light emitting diodes, to combine light emitting diodes that emit light having different wavelengths, or to combine a fluorescent body with a light emitting chip that emits light in a predetermined range of wavelength, such as, for example, ultraviolet rays.

In an exemplary embodiment, the point light source elements 1410 are side view-typed light emitting diodes that emit light through the sides. The support substrate 1430 is formed with a circuit pattern to mount the point light source elements 1410. For example, the support substrate 1430 may be any one of various printed circuit boards, such as, for example, a Flexible PCB (FPCB), a common printed circuit board (e.g., a rigid PCB), or a metal PCB.

The support substrate 1430 having the point light source elements 1410 is disposed on the heat conductive pad 1450. The heat conductive pad 1450 is interposed between the support substrate 1430 and the bottom of a lower container (not shown) and dissipates heat generated from the point light source elements 1410 to the bottom of the lower container. The heat conductive pad 1450 may comprise a material having a good heat conductivity, such as, for example, metallic materials.

The entire region of the heat conductive pad 1450 is sectioned into several unit regions where groups of the point light source elements ($G_1$ to $G_5$) are disposed. That is, the heat conductive pad 1450 is sectioned into a unit region A for a first point light source element group $G_1$, a unit region B for a second point light source element group $G_2$, a unit region C for a third point light source element group $G_3$, a unit region D for a fourth point light source element group $G_4$, and a unit region E for a fifth point light source element group $G_5$. Each point light source element group includes four point light source elements. That is, the first point light source element group $G_1$ includes a first point light source element $1410_{1a}$ to a fourth point light source element $1410_{1d}$ and the other groups of point light source element have substantially the same configuration. In an exemplary embodiment of the present invention, four point light source elements are arranged in a line in each group of point light source element.

The heat conductive pad 1450 includes the central portion I with dense point light source elements and edge portions II at both sides of the central portion I. The central portion includes the unit regions B, C and D while the left and right edge portions II includes the unit regions A and E, respectively. In the heat conductive pad 1450, the unit region pertaining to the edge portions II, i.e. the unit regions A or E is formed smaller in area than any one of the unit regions pertaining to the central portion I, i.e. the unit regions B, C and D. In an exemplary embodiment, the unit regions A and E of the edge portions II are formed into a trapezoid with the height Ly and the base $L_A$ and $L_E$, respectively. In an exemplary embodiment, the unit region B in the central portion I can be formed into a square or a rectangular shape with the base $L_B$ and the height $L_Y$, where $L_A = L_B = L_E$.

When the unit regions in the central portion I are larger in area than the unit regions in the edge portions II, the unit regions with dense point light source elements 1410 is improved in dissipation efficiency, so that the heat conductive pad 1450 can be controlled to dissipate heat uniformly throughout the whole regions.

The heat conductive pad 1450 shown in FIG. 11 is sectioned into a unit region A to a unit region E and formed into a substantially half octagon.

The upper side of the heat conductive pad 1450, i.e. the shorter side is about 100 mm in length ($L_2$). The base opposite to the upper side, i.e. the longer side is about 265 mm in length ($L_1$). The first height $H_1$ is about 15.75 mm, and the second height $H_2$ is about 30 mm. The dimension of the heat conductive pad 1450 is a heat conductive pad according to an exemplary embodiment of the present invention and may be variously changed. For example, a ratio among each side can be when the shorter side of the heat conductive pad 1450 is 1 in length, the longer side may be 2.6 to 2.8, the first height can be 0.1 to 0.2, and the second height can be 0.29 to 0.31.

Figure 12A:
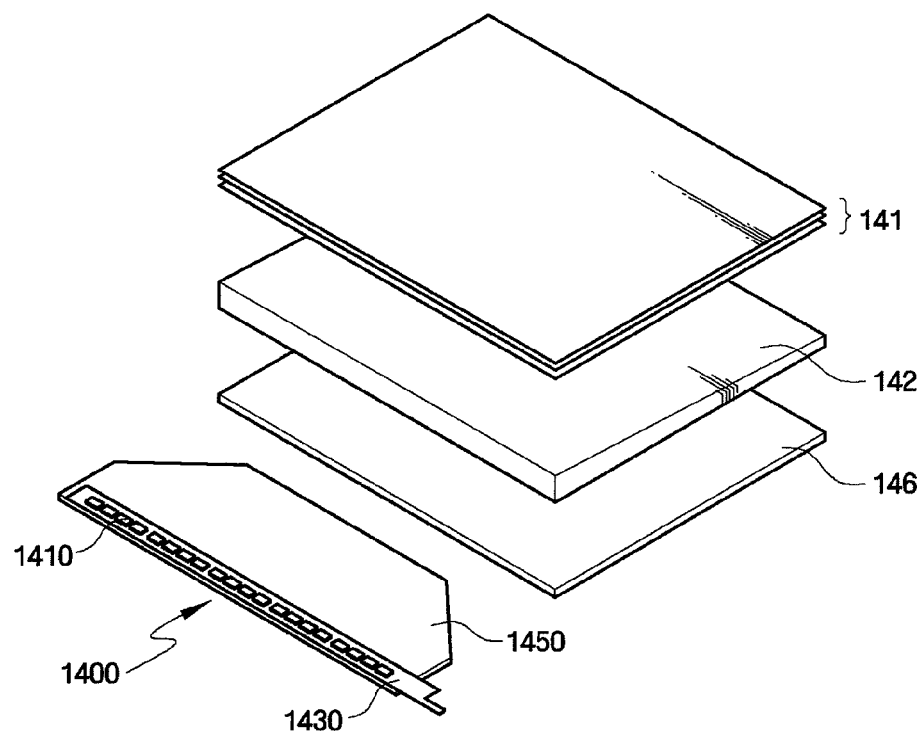
FIG. 12A is an exploded perspective view of a backlight unit having a point light source assembly according to an exemplary embodiment of the present invention.
Figures 12B, 13:
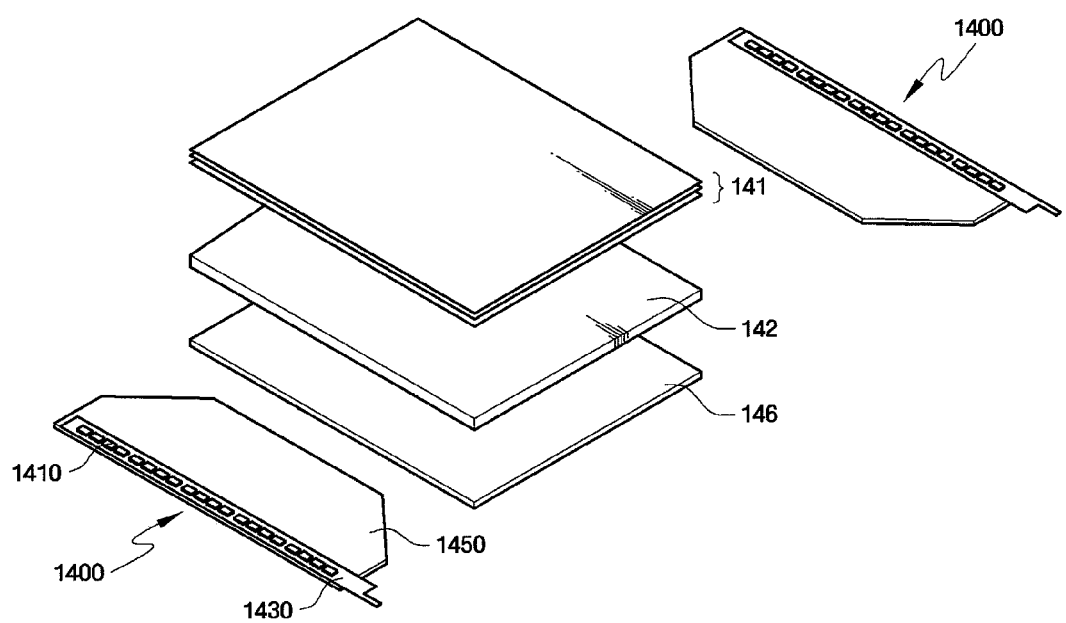
FIG. 12B is a backlight unit according to an exemplary embodiment of the present invention.
FIG. 13 is a table illustrating heat dissipation effects of a point light source assembly.

FIG. 12A is an exploded perspective view of a backlight unit having a point light source assembly according to an exemplary embodiment of the present invention. FIG. 12B is an exploded perspective view of a backlight unit according to an exemplary embodiment of the present invention.

Referring to FIGS. 12A and 12B, a backlight unit includes the light guide plate 142, a point light source assembly 1400 that provides light to the light guide plate 142, optical sheets 141 disposed on the upper surface of the light guide plate 142, and a reflective sheet 146 disposed under the light guide plate 142.

The point light source assembly 1400 includes point light source elements 1410 mounted on the support substrate 1430 and a heat conductive pad 1450 in which the unit regions pertaining to the central portion are smaller in area than those pertaining to the edge portions. The point light source assembly 1400 is disposed at a side (see e.g., FIG. 12A) or both sides (see e.g., FIG. 12B) of the light guide plate 142 and used to provide light to the light guide plate 142. The light guide plate 142 converts light with optical distribution of a point light source type that is generated from the point light source assembly 1400 into light with optical distribution of a surface light source type.

FIG. 13 shows a table for comparing heat dissipation of a point light source assembly of a relate art and a point light source assembly of an exemplary embodiment of the present invention. In FIG. 13, a point light source assembly that has a heat conductive pad in which the unit regions in the central portion is the same as the unit regions in the edge portion in area is selected for the related art, and a point light source assembly in which the unit regions in the central portion are larger in area than the unit regions in the edge portions as described above is selected for an exemplary embodiment of the present invention.

According to the related art, the point light source elements at the left edge were 44.4° C. in temperature, the point light source elements at the right edge were 42.2° C., and the point light source elements at the central portion were 47.4° C. Accordingly, it can be seen from the table that the point light source elements at the central portion is about 3 to about 4° C. higher than the edge portions. The differences in temperature are related to the differences in luminance of the point light source elements.

According to an exemplary embodiment of the present invention, the point light source elements at the left edge portion were 45.1° C. in temperature, the point light source elements at the right edge were 45.9° C., and the point light source elements at the central portion were 45.4° C. Accordingly, it can be seen from the table that differences in temperature are not substantial in the point light source elements in an exemplary embodiment of the present invention. As a result, luminance of the whole point light source elements on the heat conductive pad is almost uniformly distributed.

Figure 14A:
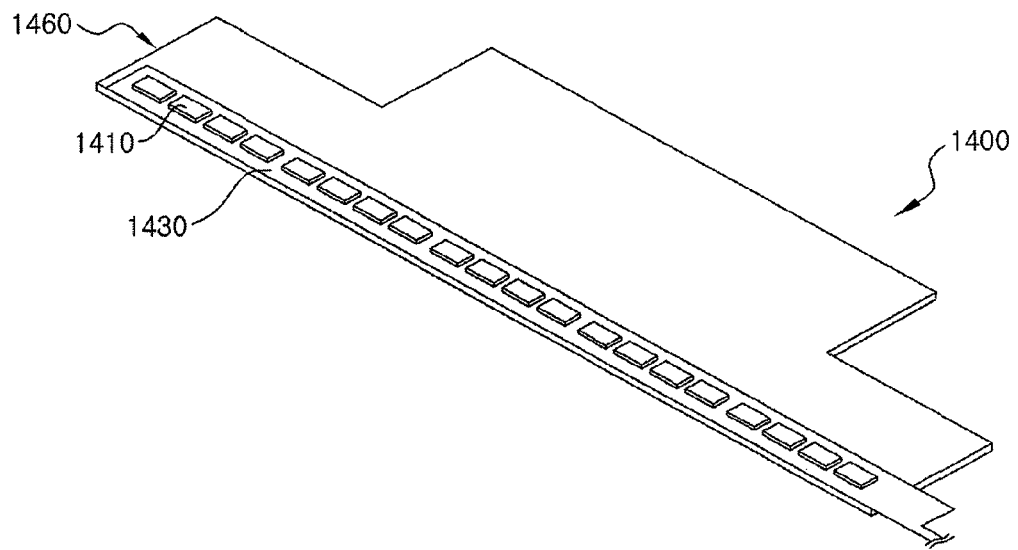
FIG. 14A is a perspective view of a point light source assembly included in a liquid crystal display according to an exemplary embodiment of the present invention.
Figure 14B:
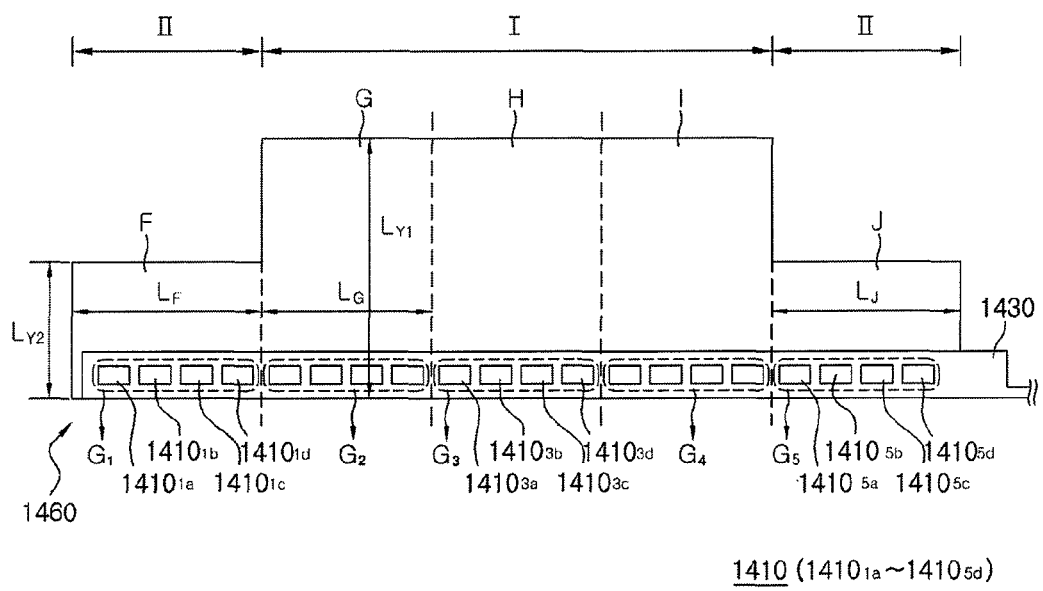
FIG. 14B is a plan view of a point light source assembly according to an exemplary embodiment of the present invention.

FIG. 14A is a perspective view of a point light source assembly included in a liquid crystal display according to an exemplary embodiment of the invention, and FIG. 14B is a plan view of a point light source assembly according to an exemplary embodiment of the present invention.

The point light source assembly 1400 includes point light source elements 1410, a support substrate 1430, and a heat conductive pad 1460.

The entire region of the heat conductive pad 1460 is sectioned into several unit regions where groups of point light source element ($G_1$ to $G_5$) are disposed. That is, the heat conductive pad 1460 is sectioned into a unit region F for a first point light source element group $G_1$, a unit region G for a second point light source element group $G_2$, a unit region H for a third point light source element group $G_3$, a unit region I for a fourth point light source element group $G_4$, and a unit region J for a fifth point light source element group $G_5$. Each point light source element group includes four point light source elements. That is, the first point light source element group $G_1$ includes a first point light source element $1410_{1a}$ to a fourth point light source element $1410_{1d}$, and the other groups of point light source element have substantially the same configuration. In an exemplary embodiment of the present invention, four point light source elements are arranged in a line in each group of point light source element.

The heat conductive pad 1460 is divided into the central portion I with dense point light source elements and edge portions II at both sides of the central portion I. The central portion includes the unit regions G, H and I while the left and right edge portions II include the unit regions F and J, respectively. In the heat conductive pad 1460, the unit region pertaining to the edge portions II, i.e. the unit regions F or J is formed smaller in area than any one of the unit regions pertaining to the central portion I, i.e. the unit regions G and I. In an exemplary embodiment of the present invention, the unit regions F and J of the edge portions II are formed into a square or a rectangular shape with the height $L_{y2}$ and the base $L_F$ and $L_J$. The unit region G in the central portion I can be formed into a trapezoid with the base $L_G$ and the height $L_{y1}$, where $L_F=L_J=L_G$ and $Ly_2<Ly_1$. However, the shapes of the unit regions are not limited to the above and may be variously modified.

According to an exemplary embodiment of the present invention, by increasing a heat dissipating rate for point light source assemblies at relatively high-temperature regions, color uniformity can be improved throughout a display.

Although the illustrative embodiments of the present invention have been described herein with reference to the accompanying drawings, it is to be understood that the present invention should not be limited to those precise embodiments and that various other changes and modifications may be affected herein by one of ordinary skill in the related art without departing from the scope or spirit of the invention. All such changes and modifications are intended to be included with the scope of the invention as defined by the appended claims.

What is claimed is:

1. A liquid crystal display comprising:
a light guide plate guiding incident light;
a first point light source assembly including first point light source elements providing the light to the light guide plate and a first support substrate having the first point light source elements, the first point light source assembly being disposed at one side of the light guide plate;
a second point light source assembly including second point light source elements providing the light to the light guide plate and a second support substrate having the second point light source elements, the second point light source assembly being disposed at the opposite side of the light guide plate;
a liquid crystal panel assembly disposed on the light guide plate and displaying image information; and
a lower container accommodating the light guide plate, first and second point light source assemblies, and liquid crystal panel assembly,
wherein the first support substrate is larger in area than the second support substrate,
wherein a number of the first point light source elements is same as a number of the second point light source elements,
wherein the lower container comprises a bottom, a first side and a second side substantially perpendicular to the bottom, a first groove disposed between the bottom and the first side, and a second groove disposed between the bottom and the second side, and
the first groove is deeper than the second groove.

2. The liquid crystal display of claim 1, wherein the first support substrate is larger in width than the second support substrate.

3. The liquid crystal display of claim 1, wherein a central portion is larger in width than edge portions in the first support substrate.

4. The liquid crystal display of claim 1, wherein the first groove is deeper at a central portion than at edge portions.

5. The liquid crystal display of claim 1, wherein:
the liquid crystal panel assembly comprises a liquid crystal panel and a chip film package connected to a side of the liquid crystal panel and providing driving signals to the liquid crystal panel; and
the first point light source assembly is disposed adjacent to the chip film package.

6. The liquid crystal display of claim 5, wherein the chip film package is connected with data lines of the liquid crystal panel and provides data driving signals to the liquid crystal panel.

7. The liquid crystal display of claim 1, further comprising:
first and second heat conductive pads interposed between the lower container and the first and second point light source assemblies, respectively.

8. The liquid crystal display of claim 7, wherein the first heat conductive pad is larger in area than the second heat conductive pad.

9. The liquid crystal display of claim 8, wherein the first heat conductive pad is larger in width than the second heat conductive pad.

10. The liquid crystal display of claim 8, wherein the first heat conductive pad is larger in width at a central portion than at edge portions.

11. The liquid crystal display of claim 10, wherein the central portion comprises a material having a heat conductivity higher than a heat conductivity of the edge portions in the first heat conductive pad.

12. The liquid crystal display of claim 1, wherein the one side and the opposite side of the light guide plate have a same length wherein the length is parallel with an arrangement direction of the first point light source elements and the second point light source elements.

* * * * *